United States Patent [19]

Petercsak et al.

[11] Patent Number: 4,779,712

[45] Date of Patent: Oct. 25, 1988

[54] EQUIPOISE ASSEMBLY

[75] Inventors: Douglas W. Petercsak, Thompson Station, Tenn.; James P. Foley, Levittown, Pa.

[73] Assignee: General Electric Company, East Windsor, N.J.

[21] Appl. No.: 907,220

[22] Filed: Sep. 15, 1986

[51] Int. Cl.⁴ .............................................. F16D 63/00

[52] U.S. Cl. .................................... 188/379; 244/173; 267/136

[58] Field of Search ................ 267/136; 188/378, 379, 188/380; 244/158 R, 173; 16/1 C

[56] References Cited

U.S. PATENT DOCUMENTS

| | | | |
|---|---|---|---|
| 2,609,191 | 9/1952 | Foster | 267/1 |
| 2,609,193 | 9/1952 | Foster | 267/1 |
| 3,322,379 | 5/1967 | Flannelly | 267/136 |
| 3,889,551 | 6/1975 | Harmening | 74/469 |
| 4,512,448 | 4/1985 | Estang | 188/378 |
| 4,527,951 | 7/1985 | Trier | 188/378 X |
| 4,609,083 | 9/1986 | Stuhler | 188/378 |

FOREIGN PATENT DOCUMENTS

| | | | |
|---|---|---|---|
| 48106 | 6/1981 | U.S.S.R. | 188/380 |

*Primary Examiner*—George E. A. Halvosa
*Assistant Examiner*—Matthew C. Graham
*Attorney, Agent, or Firm*—Clement A. Berard, Jr.; William H. Meise; Robert L. Troike

[57] ABSTRACT

A non-linear torque produced by an offset mass rotating on a shaft is balanced over 360° of revolution by a lever arm mounted to the shaft extending in a direction opposite that of the offset mass and a spring means for generating a constant force in the direction of gravity at the opposite end of the lever arm.

5 Claims, 4 Drawing Sheets

EQUIPOISE ASSEMBLY

This invention relates to an equipoise assembly that produces a torque about an axis that is 180° out of phase with the torque produced by an unbalanced appendage rotating about that axis.

As an antenna or a hinged appendage is deployed, the gravitational torque about its rotational axis varies sinusoidally with the angle from horizontal. Counter balances are frequently added to null this effect, at the expense of increased weight and inertia. Sometimes, this approach cannot be tolerated. For example, in the art of testing deployable appendages on satellites such as booms and antennas, a device is often necessary to off-load gravity and simulate zero G (gravity) environment. On some of these systems, a counterbalance would affect the deployment dynamics so much as to invalidate the test. An even greater problem for testing is when the appendage is required to be deployed while the satellite is spinning. In this case, a counterbalance weight cannot be used since this would be affected by centripetal forces.

An alternative approach is to null the gravitational effect with a spring driven mechanism that has relatively little mass. Existing designs use complicated arrangements of cams, springs, gearing and levers, and only act over short distances of rotation. The mass unbalance varies as a function of the cosine of the elevation angle. This nonlinear relationship results in a mechanism that is generally complex and costly to achieve. It is desired to achieve this nonlinear relationship continuously over large rotation angles at low cost.

SUMMARY OF THE INVENTION

In accordance with one embodiment of the present invention there is provided an assembly for balancing a nonlinear torque produced by an offset rotating mass on a shaft. The assembly includes a lever arm fixed at one end to the shaft extending in a direction opposite the offset direction of the offset mass and rotates with the shaft and mass. A constant force in the direction of gravity is generated at the opposite end of the lever arm. The force being of a magnitude and distance from the shaft to counter balance the mass continuously.

DESCRIPTION OF PREFERRED EMBODIMENT

Figure 1:
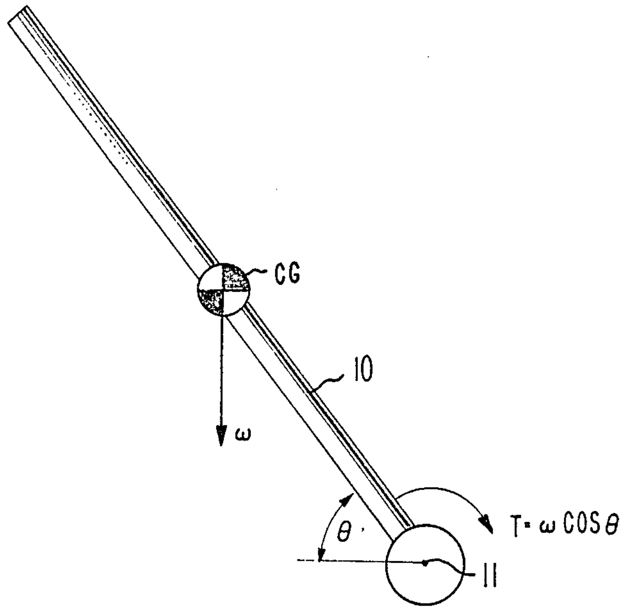
FIG. 1 is a sketch illustrating change in gravitational torque as a function of bar angle, where the bar represents an unbalanced rotating appendage.

Referring to FIG. 1 there is illustrated a bar 10 representing a mass rotated about a pivot point 11. The center of the mass of the bar 10 is represented by the symbol labeled (CG) in the middle of the bar. The mass may be an antenna or any hinged appendage where the hinge shaft is pointing toward the viewer at pivot point 11. As the antenna or hinged appendage is deployed, the force due to gravity remains downward as represented by $\omega$ but the torque changes as a function of angle $\theta$ or $T=\omega\cos\theta$. In the generalized case, the pivot axis is not horizontal but the net effect is the same. The general formula is $T=\omega\cos\alpha\cos\theta$ where $\alpha$ is the pivot axis elevation angle. However, further discussion will be based on a horizontal pivot axis for simplicity.

Figure 2:
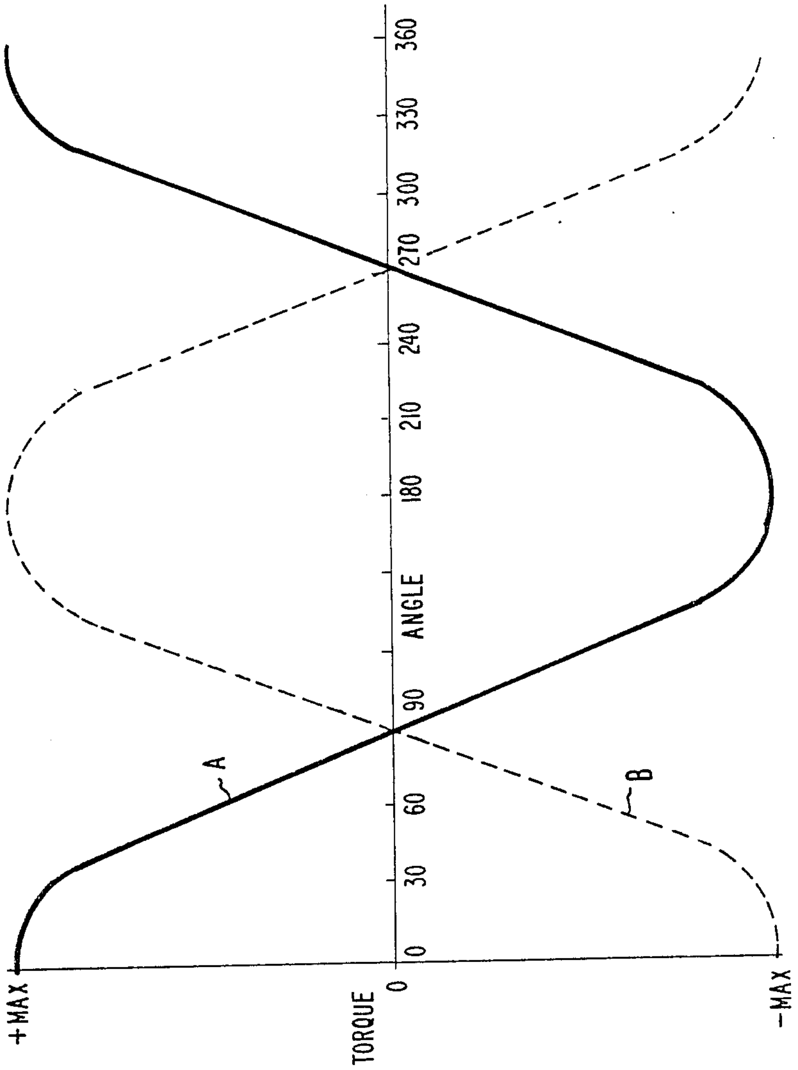
FIG. 2 is a plot of gravitational torque versus angle $\theta$ of the bar in FIG. 1.

Curve A of FIG. 2 illustrates a plot of torque produced by the bar as a function of the angle $\theta$. At angle $\theta=0$ the bar is level on the ground and there is maximum torque. At about the $\theta=45°$ position shown the torque has lessened and when the bar is straight up so $\omega$ passes through the pivot point 11 the torque is zero. At $\omega=135°$ the torque is the same as at 45° but is in the opposite direction. At 180° the torque is again maximum in the opposite direction. At the $\theta=225°$ the torque is the same amount and sign as at 135°. At $\theta=270°$ the torque is zero. At $\theta=315°$ the torque matches that at 45° in both amount and direction.

In order to completely compensate for the changing torque a device must be coupled to the pivot point 11 of the bar 10 that follows curve B of FIG. 2 so that the torque generated is 180° out of phase with respect to curve A.

In accordance with one embodiment of the present invention this compensating torque is provided by the apparatus illustrated in FIGS. 3*a*, 3*b*, 3*c* and 3*d*. Referring to the side and end views of FIG. 3*a* and 3*b* there is shown the bar 301 that may be coupled at flanged end 303 to an antenna to be deployed. The opposite end 305 of bar 301 is fixedly mounted by coupler 307 to shaft 309. Shaft 309 at the pivot point passes through bushing 310. Bushing 310 is in assembly support wall 31.

The balancing apparatus 315 is coupled to shaft 309. The apparatus includes a lever arm 319 having one end 319*a* fixedly coupled to shaft 309 at end 309*a* so that the bar 301, the shaft 309 and arm 319 move as a unitary body. The opposite end 319*b* of lever arm 319 is fixedly coupled via shaft 321 to a wheel 323. The shaft 321 passes through the lever arm at end 319*b* and the center of wheel 323. The wheel 323 includes, for example, a central aperture and ball bearings about the aperture. The shaft 321 is fixed to the lever arm 319 and moves with the bar 301, shaft 309 and arm 319. The shaft 321 passes through the aperture in wheel 323. The wheel 323 rotates on ball bearings about shaft 321. A constant downward force in the direction of arrow 88 is provided by negator springs 340, a sliding mechanism 341 and a bar 345.

Negator springs 340 are mounted on the back side of support wall 31 and are fixedly coupled via shaft 343 to a pulley wheel 365. The negator springs produce a constant torque in the direction of arrow 349 on the shaft 343 and pulley wheel 365. A cable 347 is coupled at a point 350 on the periphery of the pulley wheel 365 and wraps partially around the periphery of the pulley wheel 365.

Figure 3C:
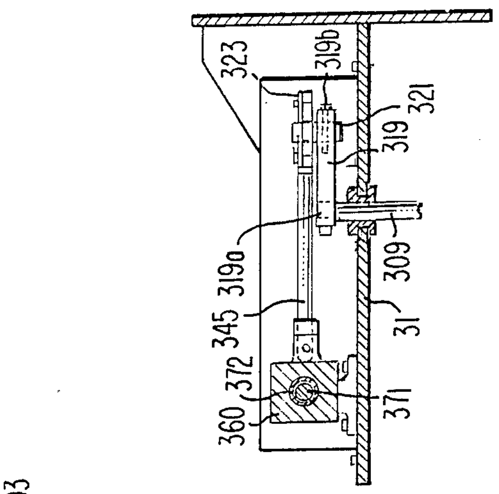
FIG. 3*c* illustrates the cross section of FIG. 3*a* taken along lines c—c of FIG. 3*a;*
Figure 3B:
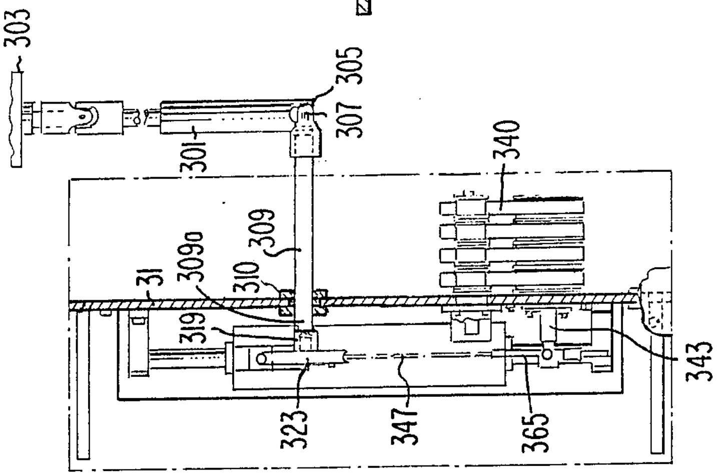
FIG. 3*b* is an end view of FIG. 3*a* taken along lines B—B in FIG. 3*a;*
Figure 3A:
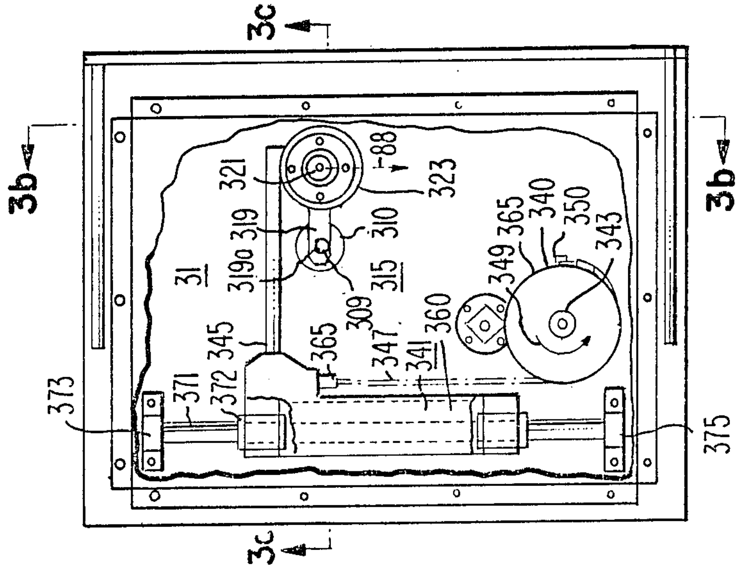
FIG. 3*a* is a side elevation view of the compensating assembly in accordance with the present invention.

The slider mechanism 341 includes a cylindrical shaft 371 which is mounted vertically in FIG. 3*a* and is oriented in a direction perpendicular to the shafts 309 and 343 which are parallel to each other. The ends of the shaft 371 are fixedly mounted using mounts 373 and 375 such that the cylindrical bar 371 extends out from the wall 31. A hollow cylindrical slider 360 is considerably shorter in length than the shaft 371. The dimension of an inner aperature of slider 360 is such that the mechanism 360 slides smoothly along the shaft 371. Bushings 372 are located within the hollow of slider shaft 360 to accommodate a smooth sliding action along the length of shaft 371. The cable 347 is connected at end 365 to this slider mechanism 360. A bar 345 shown horizontal in the FIG. 3*a* extends perpendicular to shaft 371 and perpendicular to the shafts 309 and 343. This bar 345 is mounted at one end to the slider 360 and extends and makes contact with wheel 323. Wheel 323 may be a pulley with a grooved periphery and the bar 345 as illustrated is cylindrical and fits into the groove about the wheel 323. The negator springs provide a constant force on the wheel in the direction of 88 by providing a constant pull on the bar 345 via the slider 360 and cable 347.

The position of wheel 323 and the lever arm 319 are arranged with respect to the position of bar 301 so as to produce a torque following curve B of FIG. 2 that is 180° out of phase with respect to the torque presented by the bar 301.

Figures 4A, 4B, 4C, 4D:
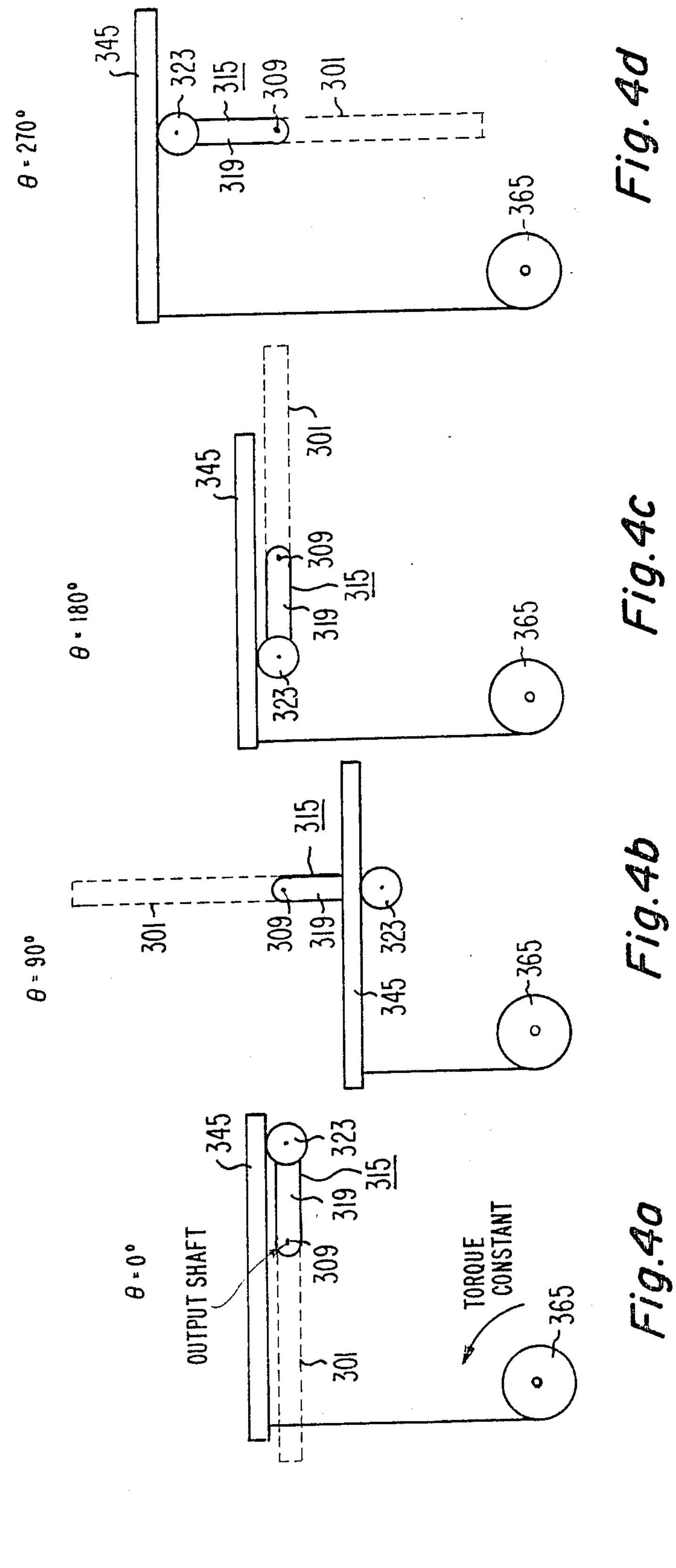
FIG. 4*a* is a sketch showing the compensating assembly with the output shaft at $\theta=0$ position.
FIG. 4*b* is a sketch with the position of the shaft at $\theta=90°$.
FIG. 4*c* is a sketch with the shaft position at $\theta=180°$.
FIG. 4*d* is a sketch with the shaft position at 270°.

Referring to FIGS. 4*a*–4*d* there is illustrated in schematic form how the constant torque provided by negator springs on the wheel 365 produces with different shaft positions the compensating and varying torque. The torque on wheel 365 produces a steady downward (direction 88) force through the center of wheel 323. The dashed lines 301 represent the deployed bar which may be the antenna mast. Referring to FIG. 4, when the lever arm 319 and wheel 323 are in the positions illustrated in FIGS. 3*a* and 3*b*, the bar 301 is in $\theta=0°$ position where maximum torque is provided by the bar 301 in the counterclockwise direction and maximum torque is applied by the assembly 315 in the opposite (clockwise) direction to that produced by arm 301. When the arm 301 is rotated into the vertical upward direction ($\theta=90°$) and the lever arm 319 is rotated to the downward position to align with arrow 80, both the center of mass of bar 301 and the force through the center of wheel 323 pass through shaft 309 (pivot axis) and the torques are both zero. This is represented in FIG. 4*b*. Between the bar 301 positions of FIG. 4*a* and 4*b* the torques produced are a function of the angle with the assembly 315 matching in opposite sense that produced by the bar 301. When the lever arm 319 and bar 301 are rotated 180° from the initial position, as in FIG. 4*c*, the bar 301 produces maximum clockwise torque and the assembly 315 provides maximum counterclockwise torque.

FIG. 4*d* illustrates when the bar has been rotated 270° and the lever arm has been rotated 270° the torques of each are zero. As seen by this illustration in the diagrams, the present invention provides an apparatus 315 that matches the torques generated by the deployable bar 301 for all 360° of revolution.

The size of the negator springs and the number of springs 340 can be adjusted to balance out the torques that are generated by the effect of the gravitational forces on the bar or offset mass. In accordance with the teachings of the present invention therefore, a torque compensation technique is provided for a rotating offset mass through 360° of rotation. This type of compensating apparatus in addition to being used to provide a zero gravity equivalent in a gravity testing facility can also be used for providing counterbalancing during deployment of a cantilevered antenna, robotic manipulator, crane, etc.

What is claimed is:

1. An apparatus for balancing a nonlinear torque produced by an offset mass rotating of a shaft with respect to a support, comprising:

a lever arm mounted at a first end to said shaft, and including a second end remote from said shaft, said lever arm extending in a direction opposite to that of said offset mass;

means for generating a force, said means for generating a force including a first wheel coupled to said lever arm at said second end and a first bar riding on said first wheel, and further including spring means coupled to said first bar to exert a constant force in the direction of gravity with said first bar against said first wheel while allowing said lever arm to rotate with said shaft, said force and the length of said lever arm being selected such that the torque generated by said constant force against said first bar, said first wheel and said lever arm equals the torque produced by said offset means.

2. The apparatus of claim 1 wherein said means for generating a force further includes a slider mechanism including a slider bar and a slider device slidably mounted on said slider bar with said slider device coupled to said first bar and to said spring means.

3. The apparatus of claim 2, wherein said means for generating a force includes one or more negator springs coupled to a second shaft, a second wheel coupled to said second shaft, and cable means coupled at one end to said second wheel and extending about a portion of the periphery of said second wheel, and coupled at the opposite end to said slider device.

4. An apparatus for balancing a nonlinear torque produced by an offset mass rotating of a first shaft with respect to a support, comprising:

a lever arm mounted at a first end to said first shaft and extending in a direction opposite that of the offset mass, said lever arm including a second end remote from said first end;

a first pulley wheel rotatably mounted on a second shaft coupled to said second end of said lever arm, said second shaft being parallel with said first shaft;

means including a first bar riding on said first pulley wheel for generating a substantially constant force on said pulley wheel in the direction of gravity, said means for generating a constant force including spring means, a slider mechanism including a slider shaft mounted to said support and extending perpendicular to said first and second shafts and a slider device mounted on said slider shaft and free to slide along said shaft, said spring means coupled at one end to said slider device and said first bar extending perpendicular to said first and second shafts and coupled to said slider device whereby said spring means provides constant force on said first pulley wheel via said slider mechanism, and said spring means providing a selected given force together with the length of said lever arm from said first shaft to said second shaft such that the torque generated balances the torque produced by the offset mass through 360° of rotation.

5. The combination of claim 4 wherein said spring means includes negator springs coupled to a third shaft and a second pulley wheel coupled to the third shaft and a cable coupled between said slider device and said second pulley wheel.

* * * * *